Patented Mar. 31, 1942

2,278,134

UNITED STATES PATENT OFFICE 2,278,134

RECOVERY OF ANTIMONY

William H. Osborn, New York, N. Y., assignor to Phelps Dodge Corporation, New York, N. Y., a corporation of New York No Drawing. Application July 26, 1940, Serial No. 347,641

22 Claims. (Cl. 75—69)

This invention relates to the recovery of antimony from other metals with which it is commonly associated and particularly to the separation of antimony from tin or lead-tin mixtures, such as solder metals.

In the refining of tin or solder metals containing metallic antimony as an impurity, it is difficult to obtain a satisfactory and economical separation of the antimony from the other metals. It is an object of the present invention to provide an improved method for effecting a separation of antimony from other metals. Another object is to provide an improved method for the recovery of antimony from drosses containing metallic aluminum or containing other active drossing metals. Other objects will become apparent.

In the refining of tin or solder metal or other metal mixtures containing metallic antimony as an impurity, metallic aluminum or metallic sodium, or some other active drossing metals, may be stirred into a pot of the tin or solder metal that is being refined, in such a manner that it will combine with the antimony present in the bath to form intermetallic compounds of relatively high melting point. These intermetallic compounds, such as the intermetallic compound of antimony and aluminum, generally given the formula AlSb, will rise to the surface of the pot as a mushy dross that can be easily separated from the rest of the bath by skimming it. These drosses necessarily entrain considerable proportions of the tin, solder metal or other metals with which they are associated. By subjecting such drosses to high pressure in a mold at temperatures above the melting point of the tin or solder metal, etc. entrained in them, it is possible to expel a large part of this entrained metal and leave a dross containing a higher content of antimony. For example, a skimmed dross containing approximately 8% antimony, 2.2% aluminum, and the balance principally tin, when subjected to pressures of approximately 30,000 pounds per square inch in a mold, at about 700° F. gave, by expulsion of tin and other molten metals, a remaining dross cake containing about 52% antimony, 14.25% aluminum and 30% tin.

Such a cake containing the intermetallic compounds AlSb, plus remaining entrained tin, etc. metal, may be finely ground in an apparatus, such as a ball mill, and then subjected to heat in an atmosphere of steam, whereby the aluminum may be oxidized to alumina and the antimony may be oxidized to the trioxide which, at temperatures in the neighborhood of 1600° F., is volatile and may be carried off in the current of steam. The higher oxides of antimony, that is, the so-called tetraoxide $Sb_2O_4$ and the pentoxide $Sb_2O_5$, are relatively non-volatile at those temperatures. Therefore, if any excess of air or free oxygen is contained in the current of gas (steam) which is used in the oxidation of the ground charge, at least some of the antimony will be oxidized to one or more of the higher oxides and so will not be removed.

A certain amount of arsenic is almost always present in the original kettle of molten metals. In forming the drosses this arsenic also forms intermetallic compounds with the aluminum and other active metals used as a drossing agent and is thus incorporated in the final press cake. If the press cake is ground in water, a very poisonous gas, arsine, or arsenous hydride ($AsH_3$), may be formed. It is also possible that the poisonous gas stibine, or antimonous hydride ($SbH_3$), may be formed. To prevent the formation of these poisonous gases in the crushing of the antimony dross cake, the cake may be crushed as it comes out of the hot press and while it is still above the temperatures at which those poisonous gases are formed and then may be dropped immediately as a coarse, crushed product into water-free oil, such as common fuel oil distillate. The crushed cake, together with the oil, is then charged into a ball mill where it may be ground without danger of generation of these poisonous gases. As a precaution against the possibility of any water or water vapor getting into the ball mill, it is advisable to connect the ball mill directly through a relief valve to a gas vent by which such gases may be exhausted. After the cake has been crushed so that the particle sizes are about 200 mesh, the charge may be removed from the ball mill and allowed to settle from the oil, and the excess oil may be decanted, or otherwise separated from the crushed particles, and reused. The crushed material from which the bulk of the oil has been decanted or otherwise removed may be dried, preferably at a temperature of approximately 500° F. in an inert atmosphere, such as carbon dioxide gas, whereby the excess oil is distilled off and a substantially dry and oil-free powdered product is obtained.

This powdered product consists essentially of crystals of aluminum-antimony intermetallic compound plus particles of metallic tin or solder. It may be introduced into an externally heated rotary kiln, through which a current of steam is passing, where it is heated to about 1600° F. The steam breaks down in the presence of the metals at this temperature and oxidizes the metals. By this operation the antimony may be oxidized to the relatively volatile trioxide which is carried off in a current of steam and may be collected in a bag house or by other suitable collecting means. The residual oxides are generally comprised of alumina, tin oxide or tin and lead oxides which are discharged from the kiln and may be further treated for recovery of their metallic values or may be reduced and added to another batch of the molten mixture to be separated.

As a specific example of this step of the process, a 200 mesh charge weighing 228 pounds and containing by analysis 52.12% antimony, 30.07% tin, 14.25% aluminum, .08% oil, and the balance other impurities such as arsenic, copper, iron, lead, etc., may be passed through an indirect heated roasting furnace, such as a rotary kiln, at a temperature of approximately 1600° F. and at a rate of speed which will keep the material in the furnace for approximately six hours while a current of steam is passed over it countercurrently. By this treatment the antimony content of the discharge may be reduced to as low as 1.3% and a fume produced which contains 67.4% antimony, 1.7% tin and 1.7% aluminum, these latter being present in the antimony trioxide fume, probably as entrained dust.

The oxidizing roast should be carefully controlled in order to avoid oxidizing the antimony to the non-volatile antimony tetra-oxide or pent-oxide. In order to avoid this, it is desirable to exclude air from the current of steam contacting the antimony, since if air becomes mixed with the current of steam, the antimony will quickly oxidize to the higher oxides and cease to fume off. If there should be excessive oxidation of the antimony so that the discharge runs high in antimony, it may be passed or repassed through a reducing atmosphere, so that the antimony may be reduced back to metallic antimony and then the steam roasting may be repeated in order that the antimony may be fumed off as the trioxide.

The preferred procedure in utilizing the invention includes the following steps:

1. Drosses from the drossing, with aluminum or sodium, or other active metals, of tin or lead-tin metals containing antimony, are introduced into a mold of a hydraulic press and subjected to pressure of 20,000 to 30,000 pounds per square inch while at a temperature above the melting point of the entrained tin and solder metals and below the melting point of the aluminum antimony intermetallic compound, for example, about 500 to 900° F. and preferably at about 700° F.

2. The press cakes of aluminum-antimony intermetallic compound are crushed while hot and above the temperature at which the poisonous gases of arsine and stibine will form (i. e., above about 450° F.), the crushing being such that the material will pass through a ⅛ inch mesh screen.

3. This crushed cake is introduced while hot into a fuel oil distillate having a specific gravity of about 12° Bé. and a flash point of about 170° F., or similar light oil free from water, and is ground in a ball mill to a suitable particle size, preferably approximately 200 mesh.

4. The ball mill discharge is allowed to settle and the excess oil decanted off. If greater speed is required, the excess oil may be filtered off instead of waiting for decantation.

5. The crushed product is then dried in an inert atmosphere at temperatures suitable for distilling off the excess oil. If a fuel oil distillate as described above is used, temperatures in the neighborhood of 500° F. are suitable for removal of the excess oil. Other temperatures may be preferable with other grinding vehicles or at pressures below or above normal atmospheric pressures or if a stream of inert gas is passed through the powder. This excess oil may be condensed by any suitable means and returned for use.

6. The crushed and dried product is heated at temperatures preferably between about 1450° and about 1700° F. in a current of steam free from excess free oxygen over that liberated from the steam, to oxidize the metallic particles and cause the antimony to volatilize as antimony trioxide. This trioxide passes off as a fume with the steam and, upon cooling, may be collected by any suitable type of dust filter, such as woolen bags, etc.

Many variations may be made in the above procedure or in its application to other uses. For example, the oxidizing may be accomplished by other oxidizing substances with which the oxidation may be controlled to avoid excessive oxidation to the higher oxides. For instance, a stream of carbon dioxide, or various mixtures of gases or other substances by which a controlled oxidation may be obtained, may be used in place of the steam. Such a mixture might be provided by the use of a direct flame with perfect combustion of any fuel, such as coal, oil or gas. In that event, however, careful control would have to be maintained to avoid an amount of unburned hydrogen or carbon monoxide, or other reducing substance, such as would prevent oxidation of antimony from the metal to the trioxide and to avoid such an amount of excess oxygen or other oxidizing substance as would oxidize the antimony trioxide to the higher oxides.

Other vehicles may be used in place of the fuel distillate in the grinding operation. For example, any light oil that is easily dried out will do. A good grade of kerosene, for instance, is satisfactory. Heavier oils can be used unless they require too high temperatures to volatilize them or are likely to leave soot residues behind that will interfere with the oxidation by steam.

The fine grinding is for the purpose of providing more surface, so that the material will oxidize more quickly and completely and the mesh size may be varied, or the fine grinding may be omitted entirely if the attendant advantage is not desired.

Also, as indicated above, other temperatures and pressures may be used in the various steps and will depend upon the particular procedure adopted. It is desirable to avoid temperatures during the controlled oxidation step that will cause the mixed oxides to be mushy and melt together, since this retards the vaporization of the antimony trioxide and will cause the mass to become pasty so that it will not pass easily through the apparatus. The lower limit of temperature in this step is determined by the rate of volatilization of antimony trioxide, which rate increases rapidly at temperatures above 1400° F.

Other means besides an indirect fired rotary kiln may be used in the oxidizing roast. For example, a rabble arm type roasting unit, which is externally heated and through which is passed an ascending current of steam countercurrent to the movement of the material being treated, may be used.

The invention may be applied to a number of different uses. For example, it may be applied to the material pressed out of the press cake in the procedure described in Patent No. 2,206,117. In that event the preliminary selective oxidation to volatilize antimony may be omitted or if the amount of antimony present is high, for example, 3 or 4%, the material may be first subjected to a selective preliminary reduction as described in that patent, whereby a portion of the antimony may be removed by volatilization during this preliminary reduction, and the subsequently extruded material may be drossed with aluminum and treated as described herein to remove the rest of the antimony.

Thus, instead of following the procedure described in that patent for the preliminary separation of antimony from fume deposits containing tin, lead, zinc, antimony, arsenic, and other similar metals, the antimony content of the mixed oxides, etc. may be reduced with the lead and tin, as described in that patent, and may be carried into the crude bullion from the compression step as metallic antimony. For example, mixtures of compounds containing antimony and one or more of the elements tin, lead, zinc, arsenic and other similar metals, may be selectively reduced to fume off zinc, if present, and to reduce antimony and other of the elements to metal. The mixture may be compressed, while maintaining it at a temperature at which the reduced metals are molten and the unreduced compounds are solid, to express molten metal from the unreduced compounds. The crude bullion from this separation may then be melted (if necessary) in a cast iron pot or other suitable receptacle and brought to a temperature of about 1100° F. Metallic aluminum, for example, in the form of scrap sheet, pigs, etc. may then be added to the melt and stirred into it. The bath may then be cooled to approximately 800° F. and a mushy dross is formed containing most of the antimony, probably as an intermetallic compound of aluminum and antimony. This mushy dross may be skimmed off and charged to a hydraulic press and the free lead and tin metal may be pressed out of it, leaving a cake which will run from about 35 to 50% antimony and 8 to 15% aluminum. This cake may be crushed and ground and given an oxidizing roast as described above to volatilize the antimony trioxide. The oxides of tin, lead and aluminum left after roasting off the antimony, if desired, may be recycled through the reduction step.

The amount of aluminum to be added in the drossing steps above described is preferably such as to give about one part of aluminum to 3½ to 4½ parts of antimony, which is slightly more aluminum than the theoretical amount in the compound AlSb. It is desirable to avoid a very great excess of the aluminum over that required for the drossing, since it is difficult to separate the aluminum from the tin. (Such separation may be effected, however, by passing superheated steam through the molten tin, for example, by introducing water into the bottom of the kettle, whereupon the water immediately vaporizes and passes up through the bath of molten tin as superheated steam.) The temperature at which the aluminum is added may be higher than that given, although such higher temperatures are not necessary and if too high may cause the aluminum to catch fire and burn to alumina before it has a chance to alloy with the antimony in the bath. Temperatures of about 1050 to 1150° F. are preferred. The temperature to which the bath is cooled for separation of dross may also be varied from the melting point of the alloy from which the antimony has been removed to approximately 1000° F.

In the treatment of an ore such as a cassiterite ore, containing 1 to 2% antimony, it may be desirable to fume off the zinc by a reduction in a reverbatory furnace in which the zinc is fumed off and the tin, lead and most of the antimony are reduced to molten metal. This molten metal may be drossed and otherwise treated as described herein for the separation of the antimony. When the cassiterite contains more antimony or when a more complete antimony elimination is desired, the ore may be roasted under a very mildly reducing condition. This causes 50 or 60% of the antimony to be fumed off and the remaining antimony may be drossed off and separated as described above.

It is obvious that the invention may be utilized in many other connections and that various other combinations of the above described procedures may be utilized. For example, some of the steps described may be omitted when the function of that step is not required or desired.

Although aluminum has been referred to specifically, other similarly acting metals may be used. The metal should be one that forms with the antimony an intermetallic compound of such a high melting point that it will separate out as a solid phase in the mass of molten material. Potassium, sodium, calcium or magnesium are examples of such metals that may be used in the place of aluminum to form the dross from which the antimony is subsequently separated. The amounts of the drossing metal added should in each case be in slight excess of the theoretical amount required, based upon the atomic weights of the ingredients in the intermetallic compound.

The terms used in describing and claiming the invention have been used as terms of description and not as terms of limitation and it is intended that all equivalents thereof be included within the scope of the terms used in the appended claims.

I claim:

1. In the separation of antimony from mixtures of metals containing it, the steps comprising heating the molten mixture in the presence of a drossing metal, separating the dross from the molten metal, disintegrating the dross and subjecting the dry disintegrated dross to a controlled oxidizing roast to oxidize antimony to antimony trioxide at temperatures at which the antimony trioxide is volatile and below that at which the mass becomes molten.

2. In the separation of antimony from antimony-aluminum drosses, the step comprising disintegrating the dross and subjecting the dry disintegrated dross to a controlled oxidizing roast to oxidize antimony to antimony trioxide at temperatures at which antimony trioxide is volatile and below that at which the mass becomes molten.

3. In the separation of antimony from antimony-aluminum drosses, the step comprising disintegrating the dross and subjecting the dry disintegrated dross to a controlled oxidizing roast in the presence of steam to oxidize antimony to antimony trioxide at temperatures at which antimony trioxide is volatile and below that at which the mass becomes molten.

4. In the separation of antimony from mixtures of metals containing it, the steps comprising heating the molten mixture in the presence of aluminum to form a dross, separating the dross from the molten metal, disintegrating the dross and subjecting the dry disintegrated dross to a controlled oxidizing roast to oxidize antimony to antimony trioxide at temperatures at which the antimony trioxide is volatile and below that at which the mass becomes molten.

5. In the separation of antimony from mixtures of metals containing it, the steps comprising heating the molten mixture in the presence of a drossing metal, separating the dross from the molten metal, and subjecting the dross to a controlled oxidizing roast in a stream of steam substantially free from excess free oxygen to oxidize antimony to antimony trioxide at temperatures at which the antimony trioxide is volatile.

6. In the separation of antimony from mixtures of metals containing it and aluminum, the steps comprising subjecting the mixture to a controlled oxidizing roast in the presence of steam and in the absence of excess free oxygen to oxidize antimony to antimony trioxide at temperatures at which antimony trioxide is volatile.

7. In the separation of antimony from mixtures of metals containing it, the steps comprising heating the molten mixture in the presence of a drossing metal, skimming off the dross and pressing it to separate molten metal, disintegrating the dross press cake and subjecting the dry disintegrated dross to a controlled oxidizing roast to oxidize antimony to antimony trioxide at temperatures at which the antimony trioxide is volatile and below that at which the mass becomes molten.

8. In the separation of antimony from mixtures of metals containing it, the steps comprising heating the molten mixture in the presence of a drossing metal, separating and pulverizing the dross from the molten metal, and subjecting the dry pulverized dross to a controlled oxidizing roast to oxidize antimony to antimony trioxide at temperatures at which the antimony trioxide is volatile and below that at which the pulverized dross tends to become mushy and melt together.

9. In the separation of antimony from mixtures of metals containing it and a drossing metal, the step comprising pulverizing the mixture and subjecting the dry pulverized dross to a controlled oxidizing roast to oxidize antimony to antimony trioxide at temperatures at which antimony trioxide is volatile and below that at which the pulverized dross tends to become mushy and melt together.

10. In the separation of antimony from mixtures of metals containing it, the steps comprising heating the molten mixture in the presence of a drossing metal, separating the dross from the molten metal, grinding the dross in the absence of substances that will hydrogenate arsenic and antimony present, and subjecting the ground dross to a controlled oxidizing roast to oxidize antimony to antimony trioxide at temperatures at which the antimony trioxide is volatile and below that at which the mass becomes molten.

11. In the separation of antimony from mixtures of metals containing it, the steps comprising heating the molten mixture in the presence of a drossing metal, separating the dross from the molten metal, grinding the dross in a stable hydrocarbon, volatilizing the hydrocarbon, and subjecting the ground dross to a controlled oxidizing roast to oxidize antimony to antimony trioxide at temperatures at which the antimony trioxide is volatile and below that at which the ground dross tends to become mushy and melt together.

12. In the separation of antimony from mixtures of it with tin, the steps comprising heating the molten mixture in the presence of aluminum to form a dross, skimming off the dross, pressing the dross to separate molten tin from the solid dross, grinding the dross in a fuel oil distillate, separating the ground dross from the distillate and subjecting it to a controlled oxidizing roast to oxidize antimony to antimony trioxide without oxidizing excessive quantities to antimony tetraoxide or pentoxide, at temperatures at which antimony trioxide will volatilize.

13. In the separation of antimony from mixtures of metals containing it, the steps comprising adding aluminum to the metals while molten, cooling and separating the dross, compressing the dross at temperatures above the melting point of the entrained metal and roasting the cake in the presence of steam to oxidize the antimony to antimony trioxide.

14. In the separation of antimony from mixtures of metals containing it, the steps comprising adding aluminum to the metals, heated to above about 1100° F., in the proportions of about one part of aluminum to 3½ to 4½ parts of antimony by weight, cooling the molten mass to a temperature below about 1000° F. at which the mass is still molten, separating the dross, compressing the dross to remove molten metal, and roasting the cake in the presence of steam at temperatures of 1450° to 1700° F. to oxidize the antimony to antimony trioxide and vaporize the latter.

15. In the separation of antimony from mixtures of compounds containing antimony and zinc and one or more of the group of elements consisting of tin, lead, arsenic and other similar metals, the steps comprising fuming off zinc while reducing at least some of the antimony and other metal compounds present to metal, adding aluminum to the molten metals to form a dross, separating the dross and subjecting it to a controlled oxidizing roast to oxidize antimony to antimony trioxide.

16. In the separation of antimony from cassiterite. The steps comprising fuming off zinc while reducing antimony and other metal compounds present to metal, adding aluminum to the molten metals to form a dross, separating and compressing the dross to separate molten metal, crushing the press cake and subjecting it to a controlled oxidizing roast in the presence of steam substantially free from excess free oxygen.

17. In the separation of antimony from mixtures of metals containing it, the steps comprising heating the molten mixture in the presence of sodium to form a dross, separating the dross from the molten metal, disintegrating the dross and subjecting the dry disintegrated dross to a controlled oxidizing roast to oxidize antimony to antimony trioxide at temperatures at which antimony trioxide is volatile, and below that at which the mass becomes molten.

18. In the separation of antimony from mixtures of compounds containing antimony and one or more of the group of elements consisting of tin, lead, zinc, arsenic and other similar metals, the steps of selectively reducing the mixture to reduce antimony and other of the elements to metal, maintaining the mixture at a temperature at which reduced metals are molten and unreduced compounds are solid, compressing the mixture to express molten metal from unreduced compounds, adding aluminum to the separated molten metal while maintained at a temperature of at least about 1100° F., cooling to below 1000° F., separating the dross, compressing the dross to separate molten metal, crushing the cake and subjecting it to a controlled oxidizing roast to oxidize antimony to antimony trioxide.

19. In the separation of antimony from mixtures of metals containing it, the steps comprising heating the molten mixture in the presence of a drossing agent, separating the dross from the molten metal, disintegrating the dross while maintaining it at a temperature above that at which poisonous gases of the metals present will be formed and subjecting the dry disintegrated dross to an oxidizing roast to oxidize antimony to antimony trioxide at a temperature at which the antimony trioxide is volatile.

20. In the separation of antimony from mixtures of metals containing it and a drossing metal, the steps comprising disintegrating the mixture at a temperature above that at which poisonous gases of the metals present will be formed and subjecting the dry disintegrated mixture to an oxidizing roast to oxidize antimony to antimony trioxide at temperatures at which the antimony trioxide is volatile.

21. In the separation of antimony from mixtures of metals containing it, the steps comprising heating the molten mixture in the presence of aluminum, removing the dross from the molten metal and compressing it to express excess molten metal, disintegrating the dross while maintaining it at a temperature above that at which stibine and arsine will form and subjecting the dry disintegrated dross to an oxidizing roast to oxidize antimony to antimony trioxide at temperatures at which the antimony trioxide is volatile.

22. In the separation of antimony from antimony-aluminum drosses, the steps comprising disintegrating the dross while maintaining it at a temperature above that at which stibine and arsine will form and subjecting the dry disintegrated dross to a sequence of oxidizing and reducing roasts to volatilize antimony as antimony trioxide.

WILLIAM H. OSBORN.